US012495346B2

(12) United States Patent
Ponnamreddy et al.

(10) Patent No.: US 12,495,346 B2
(45) Date of Patent: Dec. 9, 2025

(54) METHODS AND SYSTEMS TO REDUCE DELAYS IN VoWi-Fi HANDOVER AND PACKET SWITCHING REGISTRATION

(71) Applicant: Samsung Electronics Co., Ltd., Suwon-si (KR)

(72) Inventors: Goutham Ponnamreddy, Bengaluru (IN); Lakshmi Prasanna Jasti, Bengaluru (IN); Satya Ganesh Nutan Dev, Bengaluru (IN); Srinivas Chinthalapudi, Bengaluru (IN); Venkateswar Rao Karumanchi, Bengaluru (IN); Jaesik Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 18/183,581

(22) Filed: Mar. 14, 2023

(65) Prior Publication Data
US 2023/0300705 A1    Sep. 21, 2023

(30) Foreign Application Priority Data

Mar. 15, 2022  (IN) .............................. 202241014108
Feb. 27, 2023  (IN) .............................. 202241014108

(51) Int. Cl.
H04W 36/30      (2009.01)
H04W 36/14      (2009.01)
(Continued)

(52) U.S. Cl.
CPC ......... *H04W 36/305* (2018.08); *H04W 36/14* (2013.01); *H04W 80/04* (2013.01); *H04W 88/06* (2013.01)

(58) Field of Classification Search
CPC ............ H04L 65/1016; H04L 65/1069; H04L 65/1073; H04L 65/1095; H04L 65/80;
(Continued)

(56) References Cited

U.S. PATENT DOCUMENTS 10,057,829 B2   8/2018   Zhang et al.
10,225,777 B2   3/2019   Singh et al.
(Continued)

FOREIGN PATENT DOCUMENTS

CN   112153753 A    12/2020
CN   112616167 A     4/2021
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-Utran) access (Release 17)", 3GPP Draft; 23401-H40_CRS_IMPLEMENTED, 3RD Generation.
(Continued)

*Primary Examiner* — Kashif Siddiqui
(74) *Attorney, Agent, or Firm* — Fish & Richardson P.C.

(57) ABSTRACT

The present disclosure refers to methods and systems to reduce delays in VoWI-FI handover and packet switching registration. The method includes triggering a Router Solicitation Router Advertisement (RSRA) procedure to establish a Transmission Control Protocol/Internet Protocol (TCP/IP) interface based on a determination that the VoWi-Fi handover of a user equipment (UE) is to be performed, determining if a router advertisement (RA) is received within a first time interval, and obtaining a full Internet Protocol version 6 (IPv6) address previously used by the UE in response to determining that the RA is not received within
(Continued)

the first time interval, the full IPv6 address being for establishing the TCP/IP interface with a network.

14 Claims, 7 Drawing Sheets

(51) Int. Cl.
*H04W 80/04* (2009.01)
*H04W 88/06* (2009.01)

(58) Field of Classification Search
CPC .............. H04W 36/0022; H04W 36/14; H04W 36/305; H04W 80/04; H04W 88/06
See application file for complete search history.

(56) References Cited

U.S. PATENT DOCUMENTS

| | | | |
|---|---|---|---|
| 10,448,288 B2 | 10/2019 | Kim et al. | |
| 11,032,746 B2 | 6/2021 | Faus Gregori et al. | |
| 11,218,916 B2 | 1/2022 | Oswal et al. | |
| 11,290,926 B2 | 3/2022 | Melander et al. | |
| 11,425,612 B2 | 8/2022 | Tomici et al. | |
| 2004/0090937 A1* | 5/2004 | Chaskar | H04W 36/0019 370/252 |
| 2004/0156347 A1* | 8/2004 | Kim | H04W 36/12 370/331 |
| 2004/0208144 A1* | 10/2004 | Vinayakray-Jani | H04W 48/18 370/331 |
| 2012/0179790 A1* | 7/2012 | Kim | H04W 8/26 709/220 |
| 2015/0017985 A1* | 1/2015 | Safavi | H04W 36/302 455/436 |
| 2016/0080995 A1* | 3/2016 | Singh | H04W 36/1446 370/331 |
| 2017/0070923 A1 | 3/2017 | Li et al. | |
| 2021/0112408 A1 | 4/2021 | Pazhyannur et al. | |
| 2021/0410022 A1 | 12/2021 | Rahat et al. | |
| 2022/0022103 A1 | 1/2022 | Prakasam et al. | |
| 2022/0345949 A1* | 10/2022 | Youn | H04W 36/322 |

FOREIGN PATENT DOCUMENTS

| | | |
|---|---|---|
| EP | 3643114 A1 | 4/2020 |
| EP | 4021073 A1 | 6/2022 |
| WO | WO-2021-049841 A1 | 3/2021 |
| WO | WO-2021-111414 A1 | 6/2021 |

OTHER PUBLICATIONS

Extended European Search Report dated Sep. 27, 2023 for corresponding European Patent Application 23161847.1.
European Search Report dated Jul. 13, 2023 for corresponding EP Patent Application No. 23161847.1.
Rahman et al: "Low-latency handoff inter-WLAN IP mobility with broadband network control", Computer Communications, Elsevier Science Pubulishers BV, Amsterdam, NL, vol. 30, No. 4, Feb. 2, 2007 Feb. 2, 2007), pp. 750-766, XP005871032, ISSN: 0140-3664, DOI: 10.1016/J.COMCOM.2006.09.007.
Amin et al. "Reducing Handover Latency in Mobile IPv6-Based WLAN by Parallel Signal Execution at Layer 2 and Layer 3" (Jan. 2011) http://what-when-how.com/advances-inwirelessmobile-networks-and-applications-wimoa-2011-and-iccsea-2011/reducing-handover-latency-in-mobile-ipv6-based-wlan-by-parallel-signal-execution-at-layer-2-and-.

* cited by examiner

METHODS AND SYSTEMS TO REDUCE DELAYS IN VoWi-Fi HANDOVER AND PACKET SWITCHING REGISTRATION

CROSS-REFERENCE TO RELATED APPLICATION

This application claims the priority benefit of Indian Provisional Patent Application No. 202241014108 filed on Mar. 15, 2022, and Indian Patent Application No. 202241014108 filed on Feb. 27, 2023, the disclosure of which is hereby incorporated herein by reference in its entirety.

TECHNICAL FIELD

The present disclosure relates to methods and systems to reduce delays in voice over wi-fi handover and packet switching registration.

BACKGROUND

A Packet Data Protocol (PDP) context offers a packet data connection over which a user equipment (UE) and a network exchange Internet Protocol (IP) packets. Usage of these packet data connections is restricted to specific services. These services are accessed via access points, for example. PDP Context is a concept of the 3G Packet Data Architecture. PDP Context is mainly designed to allocate a PDP address, either an IP version 4 (IPv4) or IP version 6 (IPv6) type of address, to the UE. As for current system and design, as part of PDP context activation, the UE performs a Router Solicitation Router Advertisement (RSRA) procedure to avail a full IP address. In RSRA, a host sends router solicitation (RS) messages to routers to generate router advertisement (RA) messages. The routers send RA messages to announce their presence along with link and IP parameters. The routers also send out prefix information in the RA along with the validity of the prefix. The prefix in the RA message is used by the host to generate a global IPv6 address. During Initial registration in the event of handover to a different Radio Access Type (RAT) or during expiry of any of the address/router validity timers, the host again starts the RSRA procedure to get the new prefix information or to update the IP address parameters. There is a higher possibility of RSRA failure due to various reasons such as radio frequency (RF) sharing in Dual Subscriber Identity Module (SIM) Dual Standby (DSDS), handovers between Wi-Fi and new radio (NR)/long term evolution (LTE) call, etc.

VoWi-Fi stands for Voice over Wi-Fi. VoWi-Fi is a complementary technology to Voice over LTE (VoLTE)/ Voice over NR (VoNR) and utilizes IP multimedia subsystem (IMS) technology to provide a packet voice service delivered over IP via a Wi-Fi network. In some scenarios, the VoLTE/VoNR calls may be seamlessly handed over between LTE and Wi-Fi and vice versa. For example, the UE is connected to VoWi-Fi may decide to handover (HO) to 3GPP network, e.g., LTE or NR, based on a measured received signal strength indicator (RSSI), block error rate (BLER) and other parameters. During the handover, the UE may re-register with the IMS network and perform an RSRA procedure to avail the IP address for Internet and IMS bearers. As part of HO procedures, the network maintains the same IP address (or similar addresses) over 3GPP and Wi-Fi to ensure data and call connectivity. However, in the majority of cases, RSRA procedure takes a longer time to be completed. Also, in most of the cases, the RSRA procedure fails due to lack of response from the network, which adds further delay in HO's or leads to call drops, as shown in FIG. 1. In an example, as shown in FIG. 1, an Access Point (AP) 101 informs a VoWi-Fi module 103 for initiating the handover process, which informs a UE 105. The VoWi-Fi module 103 may be included in the AP 101, the UE 105, or an external device (e.g., an external server). The UE 105 transmits RS messages to a network 107 every 4 sec for a maximum (or upper limit) of three retries. Therefore, in this example, it takes 12 sec for the host to determine the address discovery failure on the link. This leads to a significant delay (e.g., T (Delay)). The T(Delay) is given by the Eq. 1. The aforesaid delay occurs during Wi-Fi to LTE (L2W) HO which hampers user experience.

● $T \text{ (Delay)} = 4 * \Sigma_{i=1}^{n} (\text{IPV6 RSRA}) \{n: 1 \text{ to } 3\}$  Eq. 1

Further, as part of data activation, the UE performs an IPv6 RSRA procedure. This is called source address discovery. Any UE, after acquiring the IPv6 address, is able to start a data session with the network. However, completing the RSRA procedure consumes a large amount of time (up to 15 sec). This delay in data session establishment impacts the user experience. Further, RSRA failures during data session establishment may occur due to lack of RA response from the network, and also due to Radio Frequency (RF) resource unavailability as a result of peer stack operations in DSDS. As shown in FIG. 2, during the packet switching (PS) registration process, the RF resource is granted (e.g., during call selection, NAS signalling, etc.) until PDP activation is accepted from the network (for example SIM1 NW) for a first SIM (for example SIM1). For example, the PS registration process may be initiated upon deactivation of "airplane mode." After that, RF sharing occurs in discrete manner in between the first SIM and a second SIM (for example SIM2). Further, the peer stack gets the RF resource for ongoing procedures like cell selection/Non-Access Stratum (NAS) signaling/Access Stratum (AS) signalling. The RF resource gets starved for SIM1 (e.g., the first SIM loses access to the RF resource for an extended time period), which leads to further delay/failure in Transmission Control Protocol/Internet Protocol (TCP/IP) network creation. The delay may be varied based on RF availability from 2 to 12 seconds as represented in Eq. 2

$T \text{ (Delay)} = 4 * \Sigma_{i=1}^{n} (\text{IPV6 RSRA} + DS_{meas}) \{n: 1 \text{ to } 3\}$  Eq. 2

♦ $DS_{meas}$ includes delay caused due to peer stack operations

SUMMARY OF THE PRESENT DISCLOSURE

This summary is provided to introduce a selection of concepts in a simplified format that are further described in the detailed description of the inventive concepts. This summary is not intended to identify key or essential inventive concepts, nor is it intended for determining the scope of the inventive concepts. Embodiments provide techniques which overcome the above-discussed challenges.

In embodiments, the present disclosure refers to a method to reduce delay in a Voice over Wi-Fi (VoWi-Fi) handover. The method includes triggering a Router Solicitation Router Advertisement (RSRA) procedure to establish a Transmission Control Protocol/Internet Protocol (TCP/IP) interface based on a determination that the VoWi-Fi handover of a user equipment (UE) is to be performed, determining if a router advertisement (RA) is received within a first time interval, and obtaining a full Internet Protocol version 6 (IPv6) address previously used by the UE in response to determining that the RA is not received within the first time interval, the full IPv6 address being for establishing the TCP/IP interface with a network.

In embodiments, a method to reduce delay in a packet switching (PS) registration, is disclosed. The method includes determining if a full Internet Protocol version 6 (IPv6) address is included in one of a Packet Data Protocol (PDP) or a bearer assignment in a Non-Access Stratum (NAS) signalling, skipping a Router Solicitation Router Advertisement (RSRA) procedure in response to determining that the full IPv6 address is included in the one of the PDP or the bearer assignment, and establishing a Transmission Control Protocol/Internet Protocol (TCP/IP) interface using the full IPv6 address for performing PS registration.

In embodiments, a system to reduce delay in a Voice over Wi-Fi (VoWi-Fi) handover, is disclosed. The system includes processing circuitry configured to trigger a Router Solicitation Router Advertisement (RSRA) procedure to establish a Transmission Control Protocol/Internet Protocol (TCP/IP) interface based on a determination that the VoWi-Fi handover of a user equipment (UE) is to be performed, determine if a router advertisement (RA) is received within a first time interval, and obtain a full Internet Protocol version 6 (IPv6) address previously used by the UE in response to determining that the RA is not received within the first time interval, the full IPv6 address being for establishing the TCP/IP interface with a network.

In embodiments, a system to reduce delay in a packet switching (PS) registration, is disclosed. The system includes processing circuitry configured to determine if a full Internet Protocol version 6 (IPv6) address is included in one of a Packet Data Protocol (PDP) or a bearer assignment in a Non-Access Stratum (NAS) signalling, skip a Router Solicitation Router Advertisement (RSRA) procedure in response to determining that the full IPv6 address is included in the one of the PDP or the bearer assignment, and establish a Transmission Control Protocol/Internet Protocol (TCP/IP) interface using the full IPv6 address for performing PS registration.

To further clarify the advantages and features of the present disclosure, a more particular description of the inventive concepts will be rendered by reference to specific examples thereof, which are illustrated in the appended drawings. It is appreciated that these drawings depict only typical examples of the inventive concepts and are therefore not to be considered limiting in its scope. The inventive concepts will be described and explained with additional specificity and detail with the accompanying drawings.

BRIEF DESCRIPTION OF THE DRAWINGS

These and other features, aspects, and advantages of the inventive concepts will become better understood when the following detailed description is read with reference to the accompanying drawings in which like characters represent like parts throughout the drawings, wherein.

Figure 1:
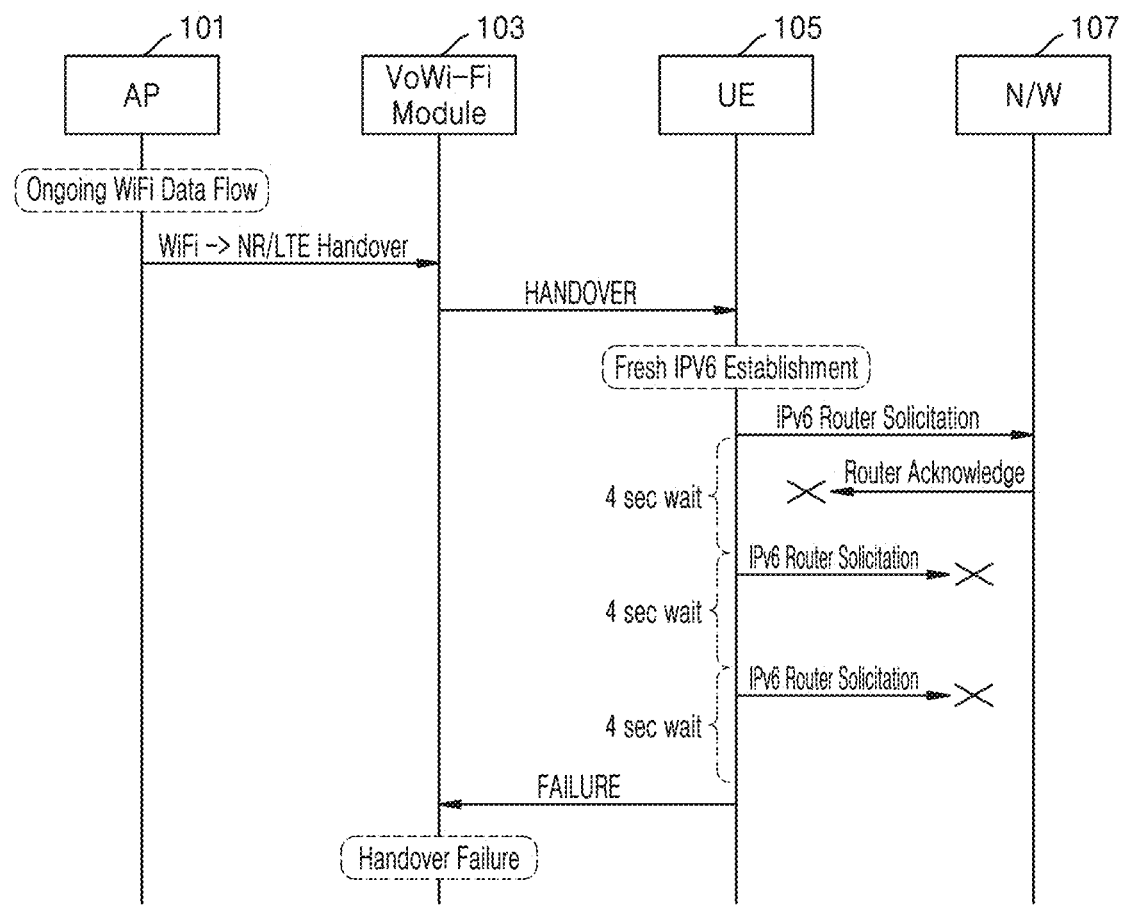
FIG. 1 illustrates a signal flow diagram of handover from a VoWi-Fi to LTE, in accordance with an existing art.
Figure 2:
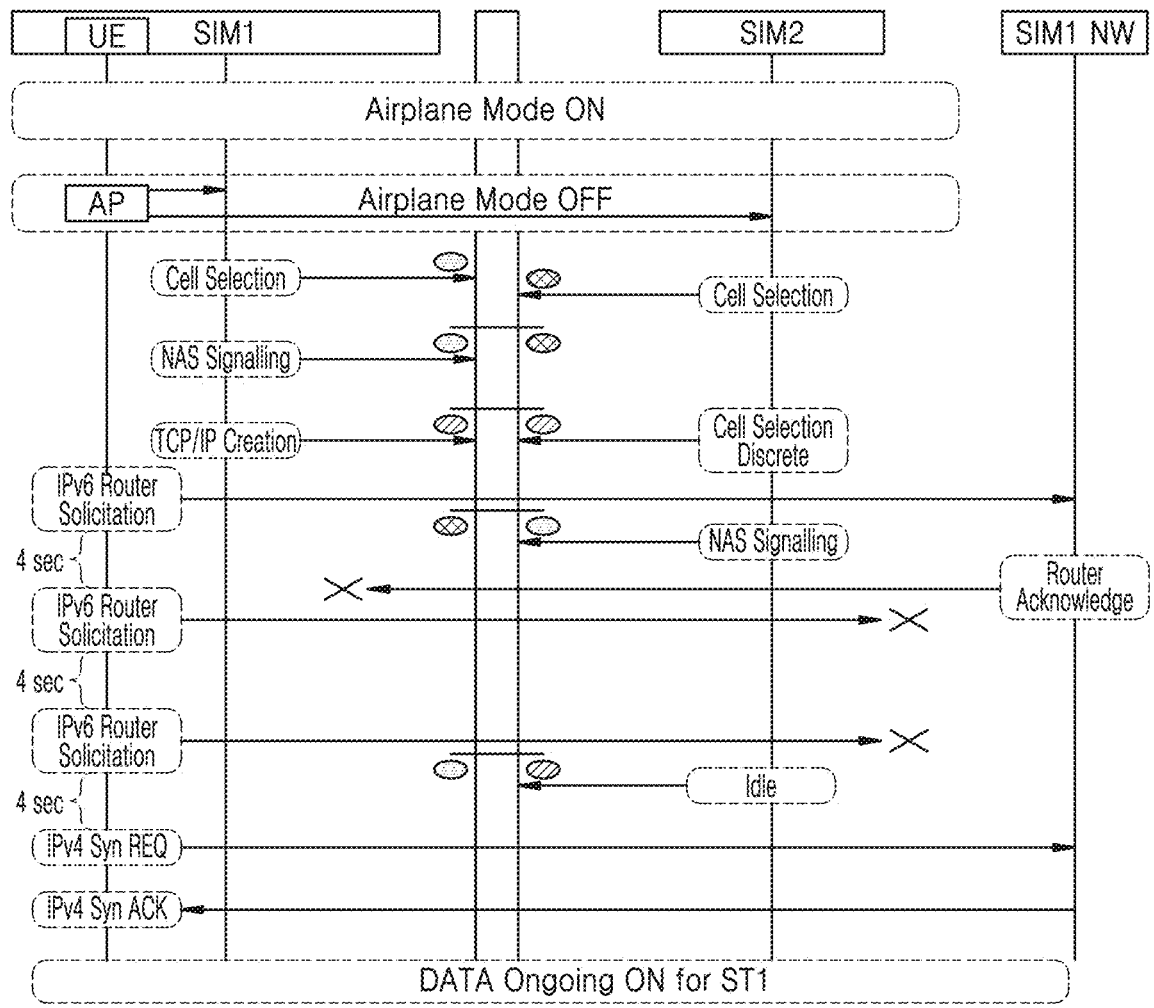
FIG. 2 illustrates a signal flow diagram of packet switching (PS) registration, in accordance with an existing art.

Further, skilled artisans will appreciate that elements in the drawings are illustrated for simplicity and may not have been drawn to scale. For example, the flow charts illustrate the method in terms of operations involved to help to improve understanding of aspects of the present inventive concepts. Furthermore, in terms of the construction of the system, one or more components of the system may have been represented in the drawings by conventional symbols, and the drawings may show only those specific details that are pertinent to understanding embodiments of the present inventive concepts so as not to obscure the drawings with details that will be readily apparent to those of ordinary skill in the art having benefit of the description herein.

DETAILED DESCRIPTION

It should be understood at the outset that although illustrative implementations of embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "embodiments" may refer to no embodiments, one embodiment, several embodiments, or all embodiments. Accordingly, the term "embodiments" is defined as meaning "no embodiment, or one embodiment, or more than one embodiment, or all embodiments."

The terminology and structure employed herein is for describing, teaching, and illuminating embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore should NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as, or a similar meaning to, that commonly understood by one having an ordinary skill in the art.

It should be noted that the terms "network", "N/W" and "NW" have been used interchangeably throughout the specification and drawings. According to embodiments, the network may refer to a base station connected to the network (e.g., the network 607, the network 703, etc.). The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

Embodiments of the present inventive concepts will be described below in detail with reference to the accompanying drawings.

Figure 3:
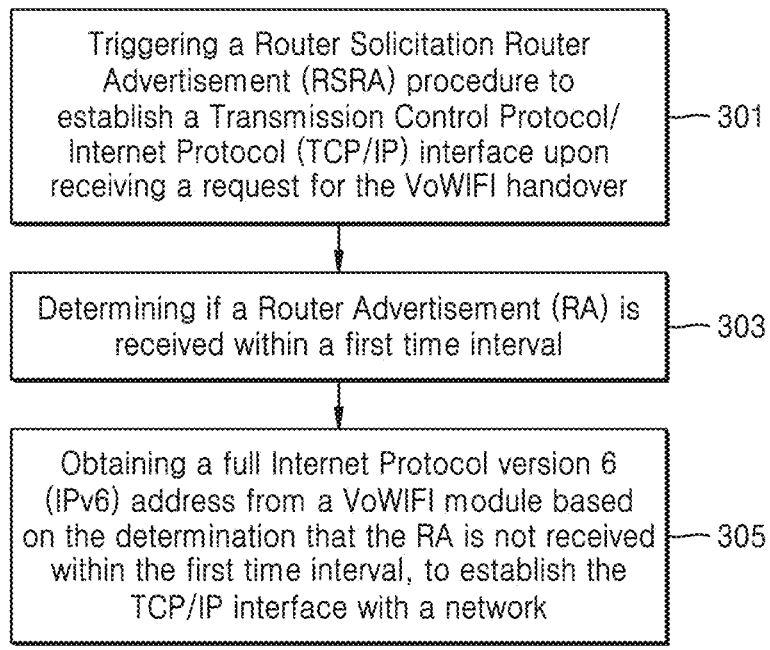
FIG. 3 illustrates a flowchart depicting a method to reduce delay in a Voice over Wi-Fi (VoWi-Fi) handover, in accordance with embodiments of the present disclosure.
Figure 4:
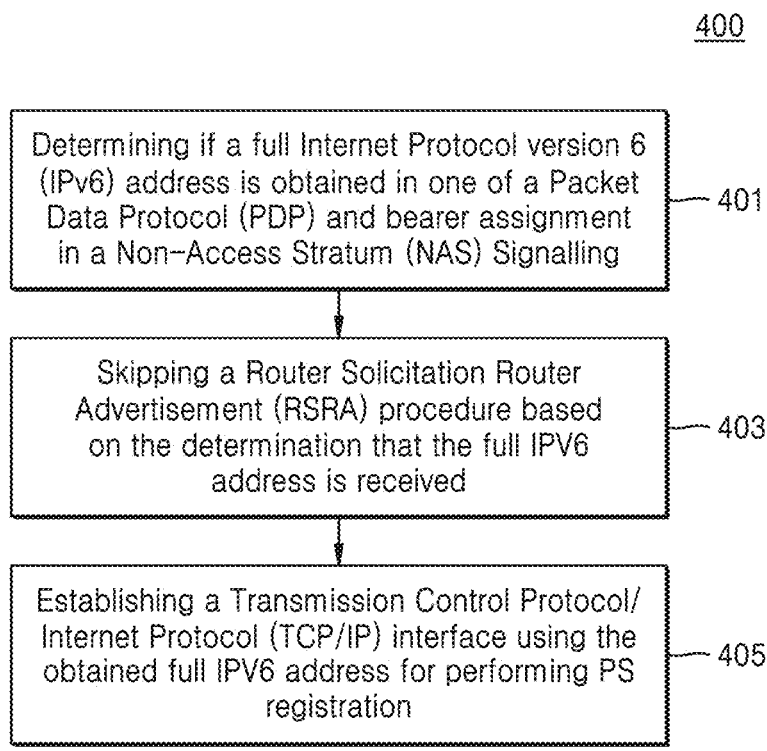
FIG. 4 illustrates a flowchart depicting a method to reduce delay in a packet switching (PS) registration, in accordance with embodiments of the present disclosure.
Figure 5:
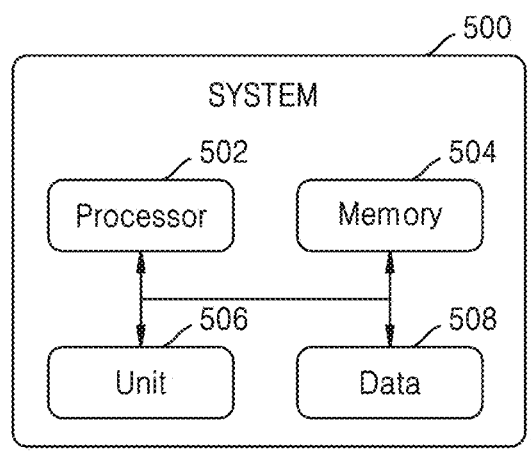
FIG. 5 illustrates a block diagram of a system to reduce delay in voice over wi-fi handover and packet switching registration, in accordance with embodiments of the present disclosure.

FIG. 3 illustrates a flowchart 300 depicting a method to reduce delay in a Voice over Wi-Fi (VoWi-Fi) handover, in accordance with embodiments of the present disclosure. FIG. 4 illustrates a flowchart 400 depicting a method to reduce delay in a packet switching (PS) registration, in accordance with embodiments of the present disclosure. FIG. 5 illustrates a block diagram of a system 500 to reduce delay in voice over wi-fi handover and packet switching registration, in accordance with embodiments of the present disclosure. For the sake of brevity, the description of the FIGS. 3-5 are explained in conjunction with each other.

The system 500 may include, but is not limited to, a processor 502, a memory 504, units 506, and/or a data unit 508. The units 506 and the memory 504 may be coupled to the processor 502.

The processor 502 may be a single processing unit or several units, all of which could include multiple computing units. The processor 502 may be implemented as one or more microprocessors, microcomputers, microcontrollers, digital signal processors, central processing units, state machines, logic circuitries, and/or any devices that manipulate signals based on operational instructions. Among other capabilities, the processor 502 may be configured to fetch and execute computer-readable instructions and data stored in the memory 504.

The memory 504 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 506 amongst other things, include routines, programs, objects, components, data structures, etc., which perform particular tasks or implement data types. The units 506 may also be implemented as, signal processor(s), state machine(s), logic circuitries, and/or any other device or component that manipulates signals based on operational instructions.

Further, the units 506 may be implemented in a hardware, by instructions executed by a processing unit, or by a combination thereof. The processing unit may comprise a computer, a processor, such as the processor 502, a state machine, a logic array, or any other suitable devices capable of processing instructions. The processing unit may be a general-purpose processor which executes instructions to cause the general-purpose processor to perform tasks or, the processing unit may be dedicated to performing functions. In embodiments of the present disclosure, the units 506 may be machine-readable instructions (software) which, when executed by a processor/processing unit, perform any of the described functionalities.

In embodiments, the system 500 may be a part of a UE (e.g., the UE 605, the UE 701, etc.). In embodiments, the system 500 may be coupled to the UE. The system 500 may be configured to perform methods as discussed in reference to FIGS. 3-4 and 6-7. In embodiments, the processor 502 may be configured to perform methods as discussed in reference to FIGS. 3-4 and 6-7. The UE (e.g., the system 500) may be fixed or mobile and may refer to any device that may communicate with a base station (e.g., the network 607, the network 703, etc.) to transmit and receive data and/or control information. For example, the user equipment 100 may be referred to as a terminal, a terminal equipment, a mobile station (MS), a mobile terminal (MT), a user terminal (UT), a subscriber station (SS), a wireless device, a handheld device, or the like.

A wireless communication network (e.g., represented by the network 607, the network 703, etc.) may support communication between multiple users by sharing available network resources. For example, in the wireless communication network, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

Figure 6:
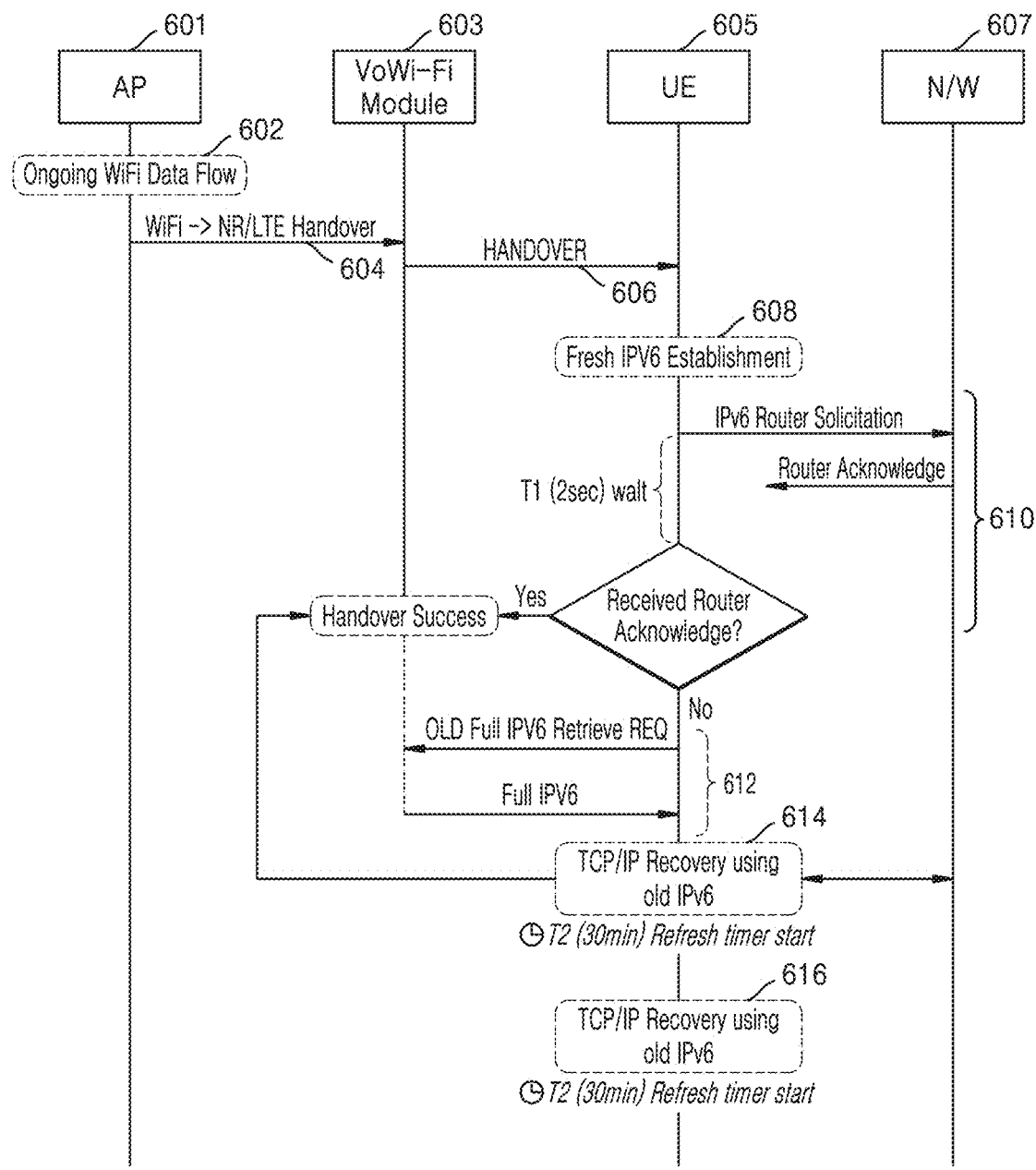
FIG. 6 illustrates a signal flow diagram of a VoWi-Fi handover, in accordance with embodiments of the present disclosure.

Referring back to FIG. 3, at operation 301, the method 300 comprises triggering a Router Solicitation Router Advertisement (RSRA) procedure to establish a Transmission Control Protocol/Internet Protocol (TCP/IP) interface upon receiving a request for the VoWi-Fi handover. According to embodiments, a UE may determine that the VoWi-Fi handover should be performed based on a signal measured by the UE (e.g., a channel measurement). The signal measured by the UE may be a received signal strength indicator (RSSI), block error rate (BLER), etc., corresponding to an access point, a 3GPP base station, etc. FIG. 3 is further explained in reference to FIG. 6 which illustrates a signal flow diagram of a VoWi-Fi handover, in accordance with embodiments of the present disclosure. For example, as shown in FIG. 6, at operation 602, Wi-Fi data flow is ongoing at an access point (AP) 601 (e.g., a Wi-Fi data flow between the AP 601 and the UE 605). At operation 604, the AP 601 informs a VoWi-Fi module 603 for initiating the handover process. At operation 606, the VoWi-Fi module 603 informs a UE 605 about the handover. In response, at operation 608, the UE 605 triggers the RSRA procedure with a network 607 (e.g., by sending router solicitation (RS)

messages to routers) to establish the TCP/IP interface. The VoWi-Fi module 603 may be included in the AP 601, the UE 605, or an external device (e.g., an external server).

Referring back to FIG. 3, at operation 303, the method 300 comprises determining if a router advertisement (RA) is received within a predefined (or alternatively, given) time interval. For example, as shown in FIG. 6, at operation 610, the UE 605 determines if the RA is received within a predefined (or alternatively, given) time interval (also referred to herein as a first time interval), for example within 2 seconds. It should be noted that the predefined (or alternatively, given) time interval may be configurable and may be configured by the UE. According to embodiments, the predefined (or alternatively, given) time interval may be shorter than the time delay to determine the address discovery failure on the link discussed in connection with Eq. 1 above.

Then, with reference to FIG. 3, at operation 305, the method 300 comprises obtaining a full Internet Protocol version 6 (IPv6) address from a VoWi-Fi module based on the determination (e.g., in response to determining that) that the RA is not received within the predefined (or alternatively, given) time interval, to establish the TCP/IP interface with the network. In embodiments, the full IPv6 address is an old (e.g., previously used) address to which the UE was connected to the VoWi-Fi. In embodiments, as discussed above, the network maintains the same IP address (or similar IP addresses) over the 3GPP network and the Wi-Fi network. Accordingly, this previously used address through which the UE was connected to the VoWi-Fi may be used to access the 3GPP network. In particular, as shown in FIG. 6, at operation 612, if the UE 605 determines (e.g., in response to determining) that the RA is not received within the predefined (or alternatively, given) time interval then the UE obtains the old (e.g., previously used) full IPv6 address and establishes the TCP/IP interface with the network 607. According to embodiments, the UE 605 may establish the TCP/IP interface with the network 607 using the old full IPv6 address without completing the RSRA procedure. According to embodiments, following operation 612, the UE 605 may start a data session with the network 607 using the old full IPv6 address, and communicate one or more signals via the data session (e.g., transmitting/receiving communication signals to/from a base station and/or another UE). However, if at operation 303, it is determined that the RA is received within the predefined (or alternatively, given) time interval, then a recovery mechanism is triggered prior to obtaining the full IPv6 address, in case of VoWi-Fi to a VoLTE/VoNR call Handover, as shown at operation 614 of FIG. 6. According to embodiments, the UE 605 may start a data session with the network 607 using a full IPv6 address obtained through successful completion of the RSRA procedure based on the determination (e.g., in response to determining that) that the RA is received within the first time interval, and may communicate one or more signals via the data session (e.g., transmitting/receiving communication signals to/from a base station and/or another UE). According to embodiments, while discussed herein in terms of IPv6, the IP address may be of a different type (e.g., IPv4).

Further, in embodiments, the method 300 may comprise initiating a predefined (or alternatively, given) recovery timer (also referred to herein as a first recovery timer) after establishment of the TCP/IP interface and triggering the RSRA procedure after expiry of the predefined (or alternatively, given) recovery time interval (also referred to herein as a second time interval). For example, as shown in FIG. 6, at operation 616, the UE 605 may initiate a predefined (or alternatively, given) recovery timer such as 30 minutes, and then, the UE 605 may trigger the RSRA procedure (e.g., to refresh the full IPv6 address) after expiry of the said predefined (or alternatively, given) recovery time interval. It should be noted that the predefined (or alternatively, given) recovery time interval may be configurable and may be configured by the UE.

Hence, during the VoWi-Fi process, the UE may trigger an RSRA procedure immediately or promptly after handover request with retransmission timer of the predefined (or alternatively, given) time interval. If no response from the network is received within the predefined (or alternatively, given) time interval, the UE may ignore the RSRA and make use of the old full IPv6 address to create a TCP/IP Interface. This results in reduced delay in establishing the TCP/IP interface. In embodiments, the reduced delay (T) may be represented as in Eq. 3

$$T \text{ (Delay)} = 2 + \Sigma_{i=1}^{n}(\text{IPV6 RSRA}) \; \{n: 1\} \qquad \text{Eq. 3}$$

Figure 7:
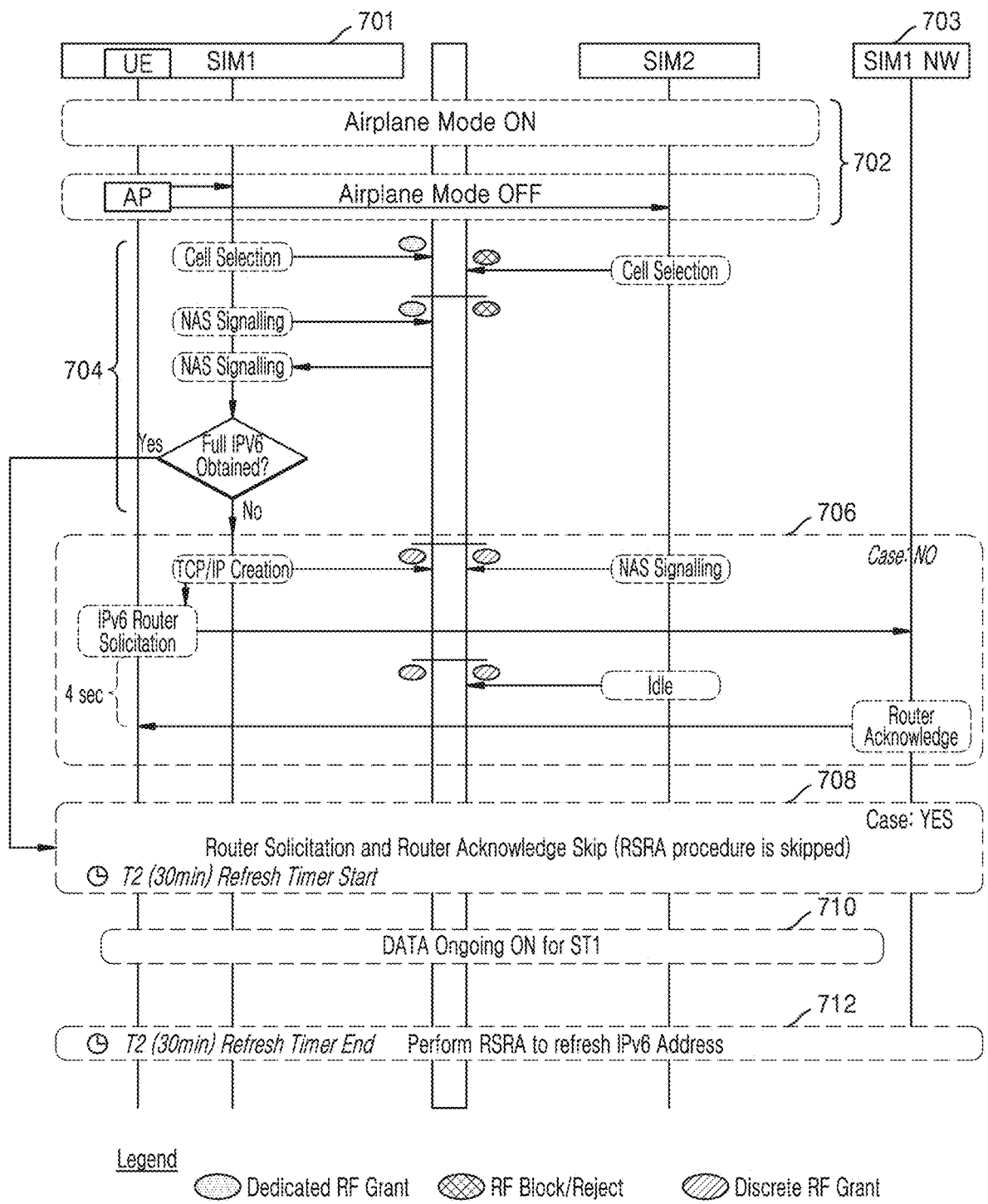
FIG. 7 illustrates a signal flow diagram of a packet switching (PS) registration, in accordance with embodiments of the present disclosure.

Referring to FIG. 4, at operation 401, the method 400 comprises determining if a full Internet Protocol version 6 (IPv6) address is obtained (e.g., included) in one of a Packet Data Protocol (PDP), and/or a bearer assignment, in a Non-Access Stratum (NAS) signalling. FIG. 4 is further explained in reference to FIG. 7 which illustrates a signal flow diagram of a Packet Switching (PS) registration, in accordance with embodiments of the present disclosure. For example, as shown in FIG. 7, at operation 702, a UE 701 (e.g., a first SIM SIM1 of the UE 701) starts the PS registration after turning OFF airplane mode. According to embodiments, at operation 702 Wi-Fi data flow is ongoing at an AP (e.g., a Wi-Fi data flow between the AP and the UE 701). Then at operation 704, the UE 701 determines if a full IPv6 address is obtained in one of a Packet Data Protocol (PDP) and/or bearer assignment in a Non-Access Stratum (NAS) signalling. As shown in FIG. 4, if yes, then at operation 403, the method 400 comprises skipping a RSRA procedure. However, if the full IPv6 address in not obtained (in the NAS signalling), the RSRA procedure is performed. For example, as shown in FIG. 7, if the UE 701 determines that the full IPv6 address is not received in any of the PDP or the bearer assignment in the NAS signalling then, at operation 706, the UE 701 performs the RSRA procedure. In embodiments, the RSRA procedure may be performed in accordance with techniques described in reference to FIG. 3.

Referring back to FIG. 4, at operation 405, the method 400 comprises establishing a Transmission Control Protocol/Internet Protocol (TCP/IP) interface using the obtained full IPv6 address for performing PS registration. In particular, as shown in FIG. 7, at operation 708 if the UE 701 determines (e.g., in response to determining that) that the full IPv6 address is received in either of the PDP or the bearer assignment in the NAS signalling, then the UE 701 establishes the TCP/IP interface using the obtained full IPv6 address for performing PS registration with a network 703 (e.g., the network connected to the first SIM SIM1). Then, as shown at operation 710, the TCP/IP interface is established and accordingly, data flow is started for a first SIM (SIM1). According to embodiments, the UE 701 may establish the TCP/IP interface with the network 703 using the full IPv6 address obtained from the NAS signalling without completing (or attempting, initiating, etc.) the RSRA procedure. According to embodiments, following operation 710, the UE 605 may start a data session with the network 703 using the full IPv6 address obtained from the NAS signalling, and communicate one or more signals via the data session (e.g., transmitting/receiving communication signals to/from a base station and/or another UE).

Further, in embodiments, the method 400 may comprise initiating a predefined (or alternatively, given) recovery timer (also referred to herein as a second recovery timer) after establishment of the TCP/IP interface and triggering the RSRA procedure after expiry of the predefined (or alternatively, given) recovery time interval (also referred to herein as a third time interval). For example, as shown in FIG. 7, at operation 712, the UE 701 may initiate a predefined (or alternatively, given) recovery timer such as 30 minutes and then, the UE 701 may trigger the RSRA procedure (e.g., the refresh the IPv6 address) after expiry of the said predefined (or alternatively, given) recovery time interval. It should be noted that the predefined (or alternatively, given) recovery time interval may be configurable and may be configured by the UE. According to embodiments, the second time interval and the third time interval may be the same, similar or different. According to embodiments, the first recovery timer and the second recover timer may be the same, similar or different.

Hence, during the PS registration, the RSRA process in TCP/IP creation may be skipped, when the full IPv6 address is obtained as part of PDP/Bearer assignment in NAS signalling. Hence, the time consumed for RSRA process may be avoided and the PS registration procedure may be optimized or improved (e.g., by reducing delay in registration).

In the event of a handover to a different RAT, or expiry of an address/validity timer, conventional communication devices and methods perform an RSRA procedure to obtain a full IP address. An increased risk of RSRA failure exists in circumstances such as RF resource sharing in DSDS devices, handovers between Wi-Fi and 3GPP networks (e.g., a NR network, LTE network, etc.). For example, in most cases RSRA failure occurs due to lack of response from a network, but may also occur due to RF resource unavailability (e.g., in DSDS devices). Such RSRA failures result in excessive delay in obtaining the full IP address and/or call drops. Also, successful performance of the RSRA procedure also involves excessive delay (e.g., up to 15 seconds).

However, according to embodiments, improved devices and methods are provided for obtaining a full IP address. For example, the improved devices and methods may obtain a previously used full IP address (e.g., from the VoWi-Fi module) based on a determination that a router advertisement has not been received in response to a router solicitation message within a first time interval. In so doing, the improved devices and methods avoid the excessive delay in detecting RSRA failure experienced by the conventional devices and methods. Also, the improved devices and methods may skip the RSRA procedure altogether based on a determination that a full IP address has been obtained in a NAS signalling (e.g., in a PDP or bearer assignment). Accordingly, the improved devices and methods may avoid the excessive delay involved in successful performance of the RSRA procedure. In view of the above, the improved devices and methods address the deficiencies of the conventional devices and methods to at least reduce delay in obtaining the full IP address (and thus, the delay of establishing a TCP/IP interface with a network, starting a data session with the network, etc.) and/or reduce call drops.

According to embodiments, operations described herein as being performed by the AP 101, the VoWi-Fi module 103, the UE 105, the network 107, the SIM1, the SIM2, the SIM1 network, the system 500, the processor 502, the units 506, the data unit 508, the AP 601, the VoWi-Fi module 603, the UE 605, the network 607, the UE 701 and/or the network 703 to may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 504). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While specific language has been used to describe the disclosure, any limitations arising on account of the same are not intended. As would be apparent to a person in the art, various working modifications may be made to the method in order to implement the inventive concepts as taught herein.

The drawings and the forgoing description give examples of embodiments. Those skilled in the art will appreciate that one or more of the described elements may well be combined into a single functional element. Alternatively, certain elements may be split into multiple functional elements. Elements from one example may be added to another example. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to challenges have been described above with regard to embodiments. However, the benefits, advantages, solutions to challenges, and any component(s) that may cause any benefit, advantage, or solution to occur or become more pronounced are not to be construed as a critical, required, or essential feature or component of any or all the claims.

We claim:

1. A method to reduce delay in a Voice over Wi-Fi (VoWi-Fi) handover, the method comprises:
   triggering a Router Solicitation Router Advertisement (RSRA) procedure to establish a Transmission Control Protocol/Internet Protocol (TCP/IP) interface based on a determination that the VoWi-Fi handover of a user equipment (UE) is to be performed;
   determining if a router advertisement (RA) is received within a first time interval; and
   obtaining a full Internet Protocol version 6 (IPv6) address previously used by the UE in response to determining that the RA is not received within the first time interval, the full IPv6 address being for establishing the TCP/IP interface with a network.

2. The method as claimed in claim 1, wherein
   the VoWi-Fi handover is from a VoWi-Fi network to one of a Voice over Long Term Evolution network or a Voice over New Radio network; and
   the method further comprises triggering a recovery mechanism prior to obtaining the full IPv6 address in response to determining that the RA is received within the first time interval.

3. The method as claimed in claim 1, wherein the full IPv6 address was previously used by the UE for connection to the VoWi-Fi.

4. The method as claimed in claim 1, further comprising:
   initiating a first recovery timer after establishment of the TCP/IP interface, the first recovery timer having a second time interval; and
   triggering the RSRA procedure after expiry of the second time interval.

5. The method as claimed in claim 1, further comprising:
   establishing the TCP/IP interface with a network using the full IPv6 address.

6. The method as claimed in claim 5, further comprising:
   starting a new data session with the network using the full IPv6 address.

7. The method as claimed in claim 1, wherein the triggering is performed in response to determining that the full IPv6 address is not included in one of a Packet Data Protocol (PDP) or a bearer assignment in a Non-Access Stratum (NAS) signalling.

8. A system to reduce delay in a Voice over Wi-Fi (VoWi-Fi) handover, the system comprises:
   processing circuitry configured to,
      trigger a Router Solicitation Router Advertisement (RSRA) procedure to establish a Transmission Control Protocol/Internet Protocol (TCP/IP) interface based on a determination that the VoWi-Fi handover of a user equipment (UE) is to be performed,
      determine if a router advertisement (RA) is received within a first time interval, and
      obtain a full Internet Protocol version 6 (IPv6) address previously used by the UE in response to determining that the RA is not received within the first time interval, the full IPv6 address being for establishing the TCP/IP interface with a network.

9. The system as claimed in claim 8, wherein
   the VoWi-Fi handover is from a VoWi-Fi network to one of a Voice over Long Term Evolution network or a Voice over New Radio network; and
   the processing circuitry is configured to trigger a recovery mechanism prior to obtaining the full IPv6 address in response to determining that the RA is received within the first time interval.

10. The system as claimed in claim 8, wherein the full IPv6 address was previously used by the UE for connection to the VoWi-Fi.

11. The system as claimed in claim 8, wherein the processing circuitry is configured to:
    initiate a first recovery timer after establishment of the TCP/IP interface, the first recovery timer having a second time interval; and
    trigger the RSRA procedure after expiry of the second time interval.

12. The system as claimed in claim 8, wherein the processing circuitry is configured to establish the TCP/IP interface with a network using the full IPv6 address.

13. The system as claimed in claim 12, wherein the processing circuitry is configured to start a new data session with the network using the full IPv6 address.

14. The system as claimed in claim 8, wherein the processing circuitry is configured to trigger the RSRA procedure in response to determining that the full IPv6 address is not included in one of a Packet Data Protocol (PDP) or a bearer assignment in a Non-Access Stratum (NAS) signalling.

* * * * *